(12) United States Patent
Kim et al.

(10) Patent No.: US 8,372,550 B2
(45) Date of Patent: Feb. 12, 2013

(54) ELECTROCHEMICAL DEVICE COMPRISING ALIPHATIC NITRILE COMPOUND

(75) Inventors: Young Soo Kim, Daejeon (KR); Soon Ho Ahn, Daejeon (KR)

(73) Assignee: LG Chem, Ltd., Seoul (KR)

(*) Notice: Subject to any disclaimer, the term of this patent is extended or adjusted under 35 U.S.C. 154(b) by 1000 days.

(21) Appl. No.: 11/034,747

(22) Filed: Jan. 14, 2005

(65) Prior Publication Data

US 2005/0208371 A1 Sep. 22, 2005

(30) Foreign Application Priority Data

Jan. 15, 2004 (KR) .................. 10-2004-0002959

(51) Int. Cl.
*H01M 6/16* (2006.01)

(52) U.S. Cl. .................. 429/340; 429/324; 429/326

(58) Field of Classification Search .................. None
See application file for complete search history.

(56) References Cited

U.S. PATENT DOCUMENTS

| | | | |
|---|---|---|---|
| 4,343,871 A | 8/1982 | Tobishima et al. | |
| 5,589,295 A | 12/1996 | Derzon et al. | |
| 5,750,282 A | 5/1998 | Chi et al. | |
| 6,096,456 A * | 8/2000 | Takeuchi et al. | 429/249 |
| 6,576,159 B1 | 6/2003 | Michot et al. | |
| 2004/0002002 A1 | 1/2004 | Mizuta et al. | |
| 2004/0013946 A1 | 1/2004 | Abe et al. | |
| 2004/0023114 A1 | 2/2004 | Sada et al. | |

FOREIGN PATENT DOCUMENTS

| | | |
|---|---|---|
| EP | 0694935 A | 1/1996 |
| EP | 1463143 A | 9/2004 |
| EP | 1508934 A | 2/2005 |
| JP | 62-82648 A | 4/1987 |
| JP | 7-176322 A | 7/1995 |
| JP | 09-161845 A | 6/1997 |
| JP | 2002-15771 A | 1/2002 |
| JP | 2002-302649 A | 10/2002 |
| JP | 2003-132943 A | 5/2003 |
| JP | 2003-132948 A | 5/2003 |
| JP | 2003-217660 A | 7/2003 |
| JP | 2004-179146 A | 6/2004 |
| JP | 2004-303437 A | 10/2004 |
| KR | 2005-0020067 A | 3/2005 |
| RU | 2143768 C1 | 12/1999 |
| SU | 1006543 A | 3/1983 |
| WO | WO-97/35332 A | 9/1997 |

* cited by examiner

*Primary Examiner* — Cynthia Lee
(74) *Attorney, Agent, or Firm* — Birch, Stewart, Kolasch & Birch, LLP

(57) ABSTRACT

The present invention provides a cathode having a protection layer formed by a complex between the surface of a cathode active material and an aliphatic nitrile compound, as well as an electrochemical device comprising the cathode. Also, the present invention provides an electrochemical device comprising: (1) a cathode having a protection layer formed by a complex between the surface of a cathode active material and an aliphatic nitrile compound; (2) an anode having a passivation layer formed by a compound selected from the group consisting of vinylene carbonate, its derivative and an ether compound; and (3) an electrolyte solution containing a lithium salt and a solvent.

7 Claims, 10 Drawing Sheets

Organic-inorganic complex structure

ELECTROCHEMICAL DEVICE COMPRISING ALIPHATIC NITRILE COMPOUND

TECHNICAL FIELD

The present invention relates to a cathode (positive electrode) having a protection layer formed by complex (an interfacial reaction) between the surface of a cathode active material and an aliphatic nitrile compound, as well as an electrochemical device comprising the cathode.

BACKGROUND ART

Recently, as electronic devices become increasingly wireless and portable, a non-aqueous electrolyte battery with high capacity and high energy density is practically used as a power source for driving these electronic devices. However, this non-aqueous electrolyte secondary battery has a problem in that its capacity is reduced with the progression of charge/discharge cycles for the following various reasons, and particularly when it is exposed to a high-temperature environment, its capacity will be more remarkably reduced:

(1) A transition metal contained in a composite oxide constituting a cathode is dissolved in a non-aqueous electrolyte and deposited on an anode, resulting in the structural breakdown of the composite oxide in the cathode or an increase in interfacial resistance;
(2) The dissolved cathode transition metal continues to grow, thus causing micro-short circuits between the cathode and the anode;
(3) The cathode transition metal deposited on the anode acts as a catalyst promoting the decomposition of the non-aqueous electrolyte, thus causing gas generation within the battery;
(4) The SEI layer of the anode becomes thicker with the progression of charge/discharge cycles and prevents the migration of $Li^+$; and
(5) The expansion and contraction of the anode active material causes slow breakdown of the SEI layer.

Generally, the non-aqueous electrolyte secondary battery has a problem in that the electrode performance and efficiency are remarkably reduced, particularly at high temperature, for the following reasons: (1) the electrode resistance is increased due to a reaction between a cathode active material such as a lithium-containing metal oxide capable of absorbing and releasing lithium and/or lithium ions, and an electrolyte solution containing a carbonate solvent and a lithium salt; and (2) a solid electrolyte interface (SEI) layer formed on the surface of an anode active material capable of absorbing and releasing lithium and/or lithium ions is slowly broken at high temperature due to continuous charge/discharge cycles, while a poor SEI layer is produced from the carbonate solvent so as to accelerate irreversible reactions, including Li corrosion.

Meanwhile, in the non-aqueous electrolyte secondary battery, the cause of a problem in the battery safety upon overcharge is as follows: A cathode active material such as a lithium-containing metal oxide capable of absorbing and releasing lithium and/or lithium ions is changed into a thermally unstable material by lithium release upon overcharge. When the battery temperature reaches the critical temperature, the structural breakdown of the cathode active material which has been unstable occurs to release oxygen. The released oxygen and an electrolyte solvent, etc., cause an exothermic chain reaction, resulting in thermal runaway.

Generally, factors which can influence the safety of the battery upon overcharge may include: (1) exothermic heat caused by the oxidation of the electrolyte solution, and (2) exothermic heat caused by the structural breakdown of the cathode.

These exothermic heats occurring alone or in combination during the progression of overcharge result in an increase in the temperature within the battery, which leads to the fire or explosion of the battery, thus causing a problem in the battery safety upon overcharge.

Meanwhile, the fire and explosion phenomena of a lithium secondary battery, which are caused by thermal runaway, occur in the following cases: (1) local short circuits occur by external physical impacts (e.g., high temperature exposure by heating) in a state where the lithium secondary battery has been charged or overcharged; (2) the battery is exploded due to exothermic heat caused by a reaction between a flammable electrolyte solution and a cathode active material at high temperature; and (3) the combustion of the electrolyte solution is accelerated by oxygen generated from the electrodes (particularly, cathode).

DISCLOSURE OF THE INVENTION

The present inventors have found that, when a protection layer is formed on a cathode by complexation between the surface of a cathode active material and an aliphatic nitrile compound, such as succinonitrile, the safety of a battery upon overcharge and/or physical impact (e.g., high temperature exposure by heating) from the outside of the battery can be improved. The present invention is based on this finding.

Furthermore, the present inventors have found that, when a passivation layer is formed on an anode by vinylene carbonate (VC), its derivative or an ether compound, and at the same time, a protection layer is formed on a cathode by complexation between the surface of a cathode active material and an aliphatic nitrile compound, the cycle life characteristics of a battery at high temperature can be improved without deterioration in the battery performance due to a synergistic effect resulted from the stable protection layers on both the electrodes (anode/cathode) during charge/discharge cycles, and also found that these protection layers prevent the structural breakdown of both the electrodes and control increases in side reaction and resistance caused by reaction with an electrolyte solution, thus improving various safety problems (e.g., explosion, bursting, etc.) occurring upon the exposure of the battery to high temperature. The present invention is based on these findings.

In one aspect, the present invention provides a cathode having a protection layer formed by a complex between the surface of a cathode active material and an aliphatic nitrile compound, as well as an electrochemical device comprising the cathode.

In another aspect, the present invention provides an electrochemical device comprising: (1) a cathode having a protection layer formed by a complex between the surface of a cathode active material and an aliphatic nitrile compound; (2) an anode having a passivation layer formed by a compound selected from the group consisting of vinylene carbonate, its derivative and an ether compound; and (3) an electrolyte solution containing a lithium salt and a solvent.

Hereinafter, the present invention will be described in detail.

In the present invention, a compound for forming a complex on the cathode surface is an aliphatic nitile compound. Examples of the aliphatic nitrile compound include compounds represented by the following formula 1:

(Formula 1)

wherein R represents an alkane group having 1-15 carbon atoms.

A polar cyano group with high dipole moment in the aliphatic nitrile compound forms a bond with a transition metal, such as cobalt, in the cathode. Particularly at high temperature, the cyano group strongly binds to the cathode surface so as to form a complex structure (or ligand) (see FIGS. 1, 2 and 12).

Figure 1:
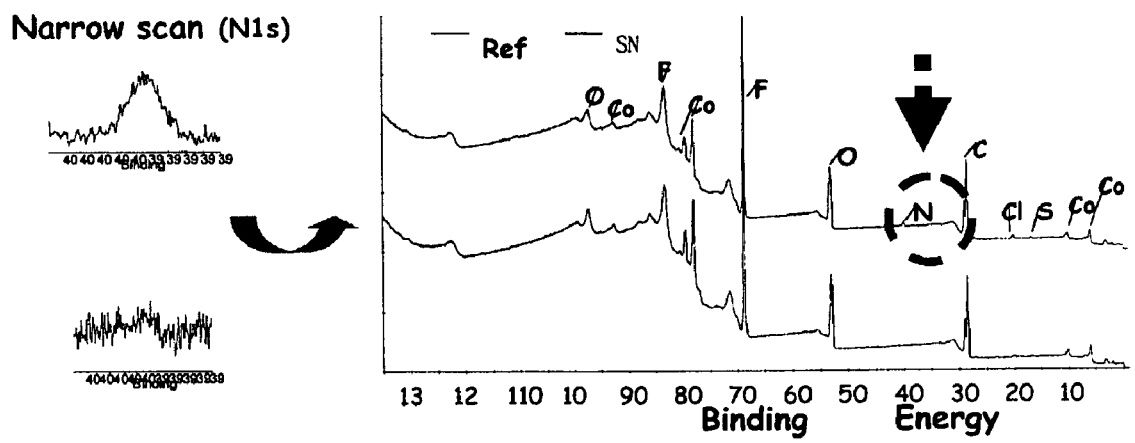
FIG. 1 shows X-Ray Photoelectron Spectroscopy data showing a reaction between the cathode surface and succinonitrile (SN), which is an aliphatic nitrile compound, as an electrolyte additive.
Figure 2:
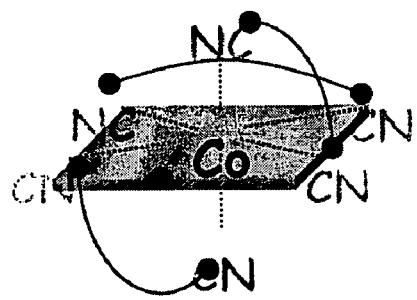
FIG. 2 is a schematic diagram of a complex structure formed by binding the cyano group of the aliphatic nitrile compound to the cobalt of the cathode.

X-ray photoelectron spectroscopy data in FIG. 1 show that a complex is formed by a bond between a cobalt metal oxide and the cyano group of the dinitrile compound.

The formation of the protection layer on the cathode surface by the complex can not only prevent some of transition metal ions from being dissolved during the progression of charge/discharge cycles so as to be deposited on the anode, but also inhibit the side reaction and gas generation caused by a reaction between the electrolyte solution and the cathode so as to allows lithium ions to be smoothly absorbed and released even at high temperature, thus preventing a reduction in the cycle life characteristics of the battery. Particularly, the aliphatic nitrile compound has an advantage in that it can provide a thermally stable electrode since it more strongly protects the electrode surface at a higher temperature than ambient temperature.

Moreover, the complex formed on the cathode surface by the aliphatic nitrile compound can control exothermic heat caused by a reaction between the electrolyte solution and the cathode and exothermic heat caused by the structural breakdown of the cathode, and reduce exothermic heat generation. This can prevent the fire or explosion of the battery from occurring due to the acceleration of combustion and the generation of thermal runaway, which are caused by oxygen generated by the structural breakdown of the cathode upon overcharge, the excessive heat generated by internal short circuits, or high temperature exposure.

Furthermore, electrolyte additives, such as cyclohexyl benzene (CHB), biphenyl (BP) and anisole, which are used as overcharge inhibitors for lithium secondary batteries which are generally used at 3V-4.2V, form a passivation layer on the cathode surface upon overcharge. Even when these additives are used in combination with the aliphatic nitrile compound, they independently act in the formation of the passivation layer without competitively reacting with the nitrile compound, such that the performance of the lithium secondary batteries which are generally used at 3V-4.2V can be maintained (see FIG. 10).

Meanwhile, since the alkane group of the compound represented by formula 1 has no reactivity, a possibility for an irreversible reaction in the use of the compound of formula 1 to occur is low, resulting in a reduction in the possibility of the battery performance deterioration caused by the use of the compound of formula 1. Particularly, succinonitrile is preferred among the compounds of formula 1.

Although the present invention exemplifies the compounds of formula 1 as the aliphatic nitrile compounds, compounds having a nitrile group only at one side in the aliphatic nitrile compounds of formula 1 are also within the scope of the present invention since they have a high possibility to show the equivalent safety and/or improvement in the cycle life characteristics of the battery to the compounds of formula 1.

It is preferred for the simplification of a battery fabrication process that a complex between the surface of the cathode active material and the aliphatic nitrile compound is formed after the aliphatic nitrile compound is introduced into an electrolyte solution. However, it is also possible that a cathode having the complex formed on the surface thereof is prepared separately and used in the assembling of a battery.

Preferably, the complex between the surface of the cathode active material and the aliphatic nitrile compound is formed by immersing a cathode having a cathode active material applied on a collector in an electrolyte solution containing the aliphatic nitrile compound and then treating the immersed cathode at high temperature. In this case, the high temperature treatment may be generally carried out either at a temperature of less than 180° C. by which the electrode active materials and binders are not influenced, or a temperature of less than 120° C. at which the aliphatic nitrile compounds are not evaporated. Preferably, the high temperature treatment is conducted at a temperature of 60-90° C., in which case it is conduct for at least 12 hours at 60° C., and for at least 12 hours at more than 80° C. The reason why the high temperature treatment is conducted is that the cyano group of the aliphatic nitrile compound forms a strong complex structure with cobalt metal or metal oxide as demonstrated in FIGS. 11 and 13.

The upper limit of use amount of the aliphatic nitrile compound is determined depending on its solubility in a solvent used in a non-aqueous electrolyte solution, but the use of an excessively large amount of the aliphatic nitrile compound can cause an excessive increase in the viscosity of the electrolyte solution and a reduction in the ion conductivity of the electrolyte solution. Thus, the aliphatic nitrile compound is preferably used at an amount of less than 20% by weight, and preferably less than 5% by weight, based on the weight of the electrolyte solution taken as 100% by weight. The lower limit of use amount of the aliphatic nitrile compound varies depending on the purpose for improving the battery safety according to the present invention and is preferably more than 1% by weight.

In the present invention, the compound for forming the passivation layer on the anode is selected from the group consisting of vinyl carbonate (VC) represented by the following formula 2, it derivative, and an ether compound:

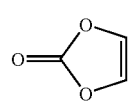

[Formula 2]

Derivative of the compound (VC) of formula 2 include derivatives where a non-polar side chain, such as an alkyl group having 1-5 carbon atoms, is bonded to the ring of formula 2.

Examples of the ether compound include benzyl methyl ether represented by the following formula 3, tetraethylene glycol dimethyl ether represented by the following formula 4, and the like:

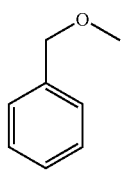

[Formula 3]

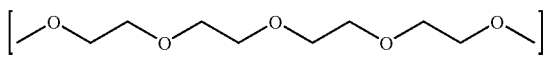

[Formula 4]

The ether compound forms the passivation layer on the anode like VC so as to show the equivalent effect to VC. Thus, the ether compound shows a synergistic effect with the aliphatic nitrile compound (see Table 1).

Table 1 below shows the performance of the ether additive among additives of passivating the anode, in the battery.

TABLE 1

| 323456 size Full cell test | | | |
|---|---|---|---|
| EC:PC:DEC = 3:2:5, 1M LiPF$_6$ Additive (%) | Capacity 0.5 C/0.2 C (mAh) | 0.5 C charge 0.5 C/1.0 C/1.5 C discharge (%) | Cycle life |
| VC (0.5 wt %) | 586 | 100/99.2/97.3 | Good |
| BME (0.5 wt %) | 588 | 100/99.0/97.0 | Good |
| TGDE (0.5 wt %) | 586 | 100/98.9/96.9 | Good |

A passivation layer formed on the anode surface by a carbonate solvent is porous and non-dense, so that it increases irreversible reactions during charge/discharge cycles so as to cause the loss of Li and the production of dendrite, resulting in a significant reduction in the battery performance.

Figure 3:
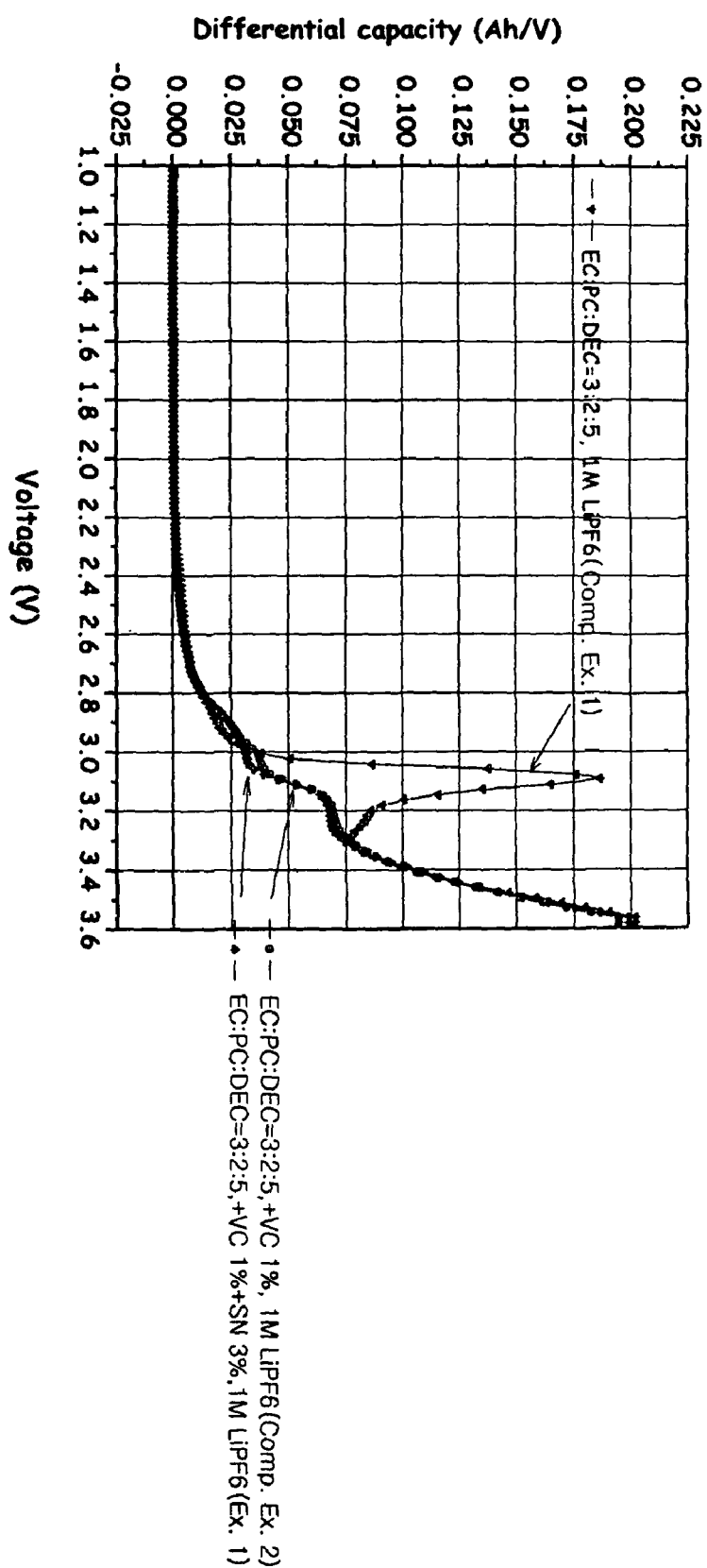
FIG. 3 shows differential capacity-voltage (dQ/dV) plots obtained to examine irreversibility and reactivity with the anode according to the presence or absence of a VC additive in an initial charge process.

The compound of passivating the anode, such as vinylene carbonate (VC), its derivative or an ether compound, plays an important role to improve the cycle life characteristics of the battery not only by forming a compact and dense protective layer upon initial charge (generally called "formation") so as to prevent the co-intercalation of the carbonate solvent into the active material with a layered structure and the decomposition reaction of the electrolyte solution, resulting in a reduction in irreversible reactions in the battery, but also by allowing only Li$^+$ to be absorbed and released through the formed protective layer (see FIG. 3). However, it can be seen that the passivation layer (SEI layer) formed by this compound is also broken slowly by the expansion and contraction of the active material during charge/discharge cycles at high temperature while a poor SEI layer is formed in the broken area by the carbonate solvent so as to accelerate irreversible reactions, including Li corrosion, such that the cycle life characteristics of the battery are significantly deteriorated with the passage of time (see FIG. 6). As a result, it can be found that the cycle life characteristics of the battery cannot be improved only by the passivation of only the anode.

Meanwhile, when only the cathode is protected with the aliphatic nitrile compound, the cathode surface will be stabilized by the interaction between the nitrile compound and the cathode. In this case, however, there is a problem in that a poor SEI layer formed by the carbonate solvent prevents smooth migration of Li$^+$ ions, so that the balance within the battery is broken down while lithium metal is deposited on the anode surface, resulting in a remarkable reduction in the cycle life characteristics of the battery at ambient temperature and high temperature.

Accordingly, it can be seen that the high-temperature cycle life characteristic (performance and efficiency) of the battery cannot be maintained by the protection of only one of the cathode and the anode. Thus, the present invention provides a secondary battery where both the cathode and the anode are protected by passivation in order to improve the high-temperature cycle life characteristics of the battery.

Although it is preferred for the simplification of a battery fabrication process that additives allowing the passivation of each of both the electrodes are introduced into the electrolyte solution, passivated cathode and anode may also be prepared separately for use in assembling a battery.

In order to be able to cause a synergistic effect between the protective layers, the protective layer on the anode should be formed by a compound capable of forming a compact and strong SEI layer, and the cathode should be protected with the aliphatic nitrile compound capable of preventing the dissolution of transition metal and forming a strong complex with transition metal or metal oxide.

Meanwhile, an aromatic dinitrile compound is decomposed by reduction faster than vinylene carbonate (VC) so as to form a poor SEI layer, thus interfering with the formation of a compact and dense protection layer by VC. However, the aliphatic nitrile compound does not cause this problem.

When the compound of passivating the anode, such as vinylene carbonate (VC), its derivative or an ether compound, is used as an electrolyte additive, the upper limit of use amount of this compound will be determined regardless of the kind of a solvent used in the non-aqueous electrolyte. However, the use of an excessive amount of this compound results in the generation of gas at high temperature, thus causing the problem of battery swelling. Accordingly, this compound is preferably used at an amount of less than 5% by weight based on 100% by weight of the electrolyte solution. The lower limit of use amount of this compound varies depending on the purpose for improving high-temperature cycle life characteristics of the battery according to the present invention and is preferably more than 1% by weight.

The non-aqueous electrolyte solution generally contains a flammable, non-aqueous organic solvent, such as cyclic carbonate, linear carbonate or a combination thereof. Examples of the cyclic carbonate include ethylene carbonate (EC), propylene carbonate (PC), gamma-butyrolactone (GBL), and the like, and examples of the linear carbonate include diethyl carbonate (DEC), dimethyl carbonate (DMC), ethylmethyl carbonate (EMC), and the like.

The non-aqueous electrolyte solution contains a lithium salt. Examples of the lithium salt include, but are not limited to, $LiClO_4$, $LiCF_3SO_3$, $LiPF_6$, $LiBF_4$, $LiAsF_6$, and $LiN(CF_3SO_2)_2$.

A typical example of an electrochemical device which can be fabricated according to the present invention is a lithium secondary battery. The lithium secondary battery may comprise:

(1) a cathode capable of absorbing and releasing lithium ions;
(2) an anode capable of absorbing and releasing lithium ions;
(3) a porous separator; and
(4) an electrolyte solution containing an lithium salt and an electrolyte solvent.

Generally, the lithium secondary battery contains a lithium-containing transition metal oxide as a cathode active material, and examples of the lithium-containing transition metal oxide are at least one selected from the group consisting of $LiCoO_2$, $LiNiO_2$, $LiMn_2O_4$, $LiMnO_2$ and $LiNi_{1-x}Co_xO_2$ where $0<X<1$. Also, as an anode active material, carbon, or lithium metal or alloy is used. Moreover, metal oxide, such as $TiO_2$ or $SnO_2$, which can absorb and release lithium ions and has a potential for lithium of less than 2V, may also be used as the anode active material.

The external shapes of the lithium secondary battery according to the present invention may include a cylindrical shape with a can, a prismatic shape and a pouch shape.

MODE FOR CARRYING OUT THE INVENTION

Hereinafter, the present invention will be described in more detail by way of the following examples. It is to be understood, however, that these examples are given for illustrative purpose only and are not construed to limit the scope of the present invention.

Example 1

A 1M $LiPF_6$ solution having a composition of EC:PC:DEC=3:2:5 was used as an electrolyte solution. To this electrolyte solution, 1% by weight of vinylene carbonate (VC) and 3% by weight of succinonitrile (SN) were added. An anode was made of artificial graphite, and a cathode was made of $LiCoO_2$. Then, using the prepared electrolyte solution, anode and cathode, a 323456-type lithium polymer battery was fabricated by a conventional method and packed with an aluminum-laminated packing material.

Example 2

A 1M $LiPF_6$ solution having a composition of EC:EMC=1:2 was used as an electrolyte solution. To this electrolyte solution, 1% by weight of VC and 3% by weight of succinonitrile were added. An anode was made of artificial graphite, and a cathode was made of $LiCoO_2$. Then, using the prepared electrolyte solution, anode and cathode, a 423450-size prismatic lithium battery was fabricated by a conventional method.

Examples 3-5

Lithium secondary batteries were fabricated in the same manner as in Example 1 except that 1% by weight of VC was added as an electrolyte additive for the enode but 3% by weight of each of sebaconitrile, dicyanopentane and dicyanohexane in place of succinonitrile was added as an electrolyte additive for the cathode.

Example 6

A lithium secondary polymer battery was fabricated in the same manner as in Example 1 except that 3% by weight of cyclohexyl benzene (CHB) and 1% by weight of biphenyl (BP) were additionally used.

Example 7

A lithium prismatic battery was fabricated in the same manner as in Example 2 except that 1% by weight of VC was added but succinonitrile was used at an amount of 1% by weight in place of 3% by weight.

Example 8

A lithium polymer battery was fabricated in the same manner as in Example 1 except that 1% by weight of VC was added but succinonitrile was used at an amount of 5% by weight in place of 3% by weight.

Example 9

A lithium prismatic battery was fabricated in the same manner as in Example 2 except that 1% by weight of VC was added but succinonitrile was used at an amount of 3% by weight in place of 5% by weight.

Example 10

A lithium polymer battery was fabricated in the same manner as in Example 1 except that 3% by weight of succinonitrile was added but VC was not added to the electrolyte solution.

Comparative Example 1

A lithium polymer battery was fabricated in the same manner as in Example 1 except that both VC and succinonitrile were not added to the electrolyte solution.

Comparative Example 2

A lithium polymer battery was fabricated in the same manner as in Example 1 except that 1% by weight of VC was added but succinonitrile was not added to the electrolyte solution.

Comparative Example 3

A lithium prismatic battery was fabricated in the same manner as in Example 2 except that 1% by weight of VC was added but succinonitrile was not added to the electrolyte solution.

Test Results

1. Test to Examine Formation of Ligand on Cathode Surface

Each of the batteries fabricated in Example 1 and Comparative Examples 1 and 2 was fully charged to 4.2V, from which the cathode with a size of about 1 cm×1 cm was then separated. The separated cathode was cleaned with dimethyl carbonate (DMC) to remove impurities remaining on the cathode surface, and tested with a X-ray photoelectron spectroscopy (XPS) system to examine the formation of ligands on the cathode surface. The XPS (ESCALAB 250) used in the analysis is a system of detecting atomic binding energy and kinetic energy so as to read atomic information to a depth of a few nm from the surface, thus identifying the constituent components of the surface. The ligand formation was examined by the produced peaks of nitrogen atoms. As shown in FIG. 1, it could be confirmed that, in the batteries fabricated without succinonitrile (Comparative Examples 1 and 2, lower graph in FIG. 1), no nitrogen atom was detected on the cathode surface, whereas, in the battery containing succinonitrile (Example 1, upper graph in FIG. 1), succininitrile formed a strong bond (ligand) with transition metal cobalt or metal oxide, indicating the clear detection of nitrogen atoms. From such results, it could be expected that the aliphatic nitrile additive would form a strong complex with the surface of the cathode active material so as to control various side reactions from the battery with the progression of charge/discharge cycles.

2. Test to Examine Formation of SEI Layer on Anode Surface

On the batteries fabricated in Example 1 and Comparative Examples 1 and 2, initial charging (formation) was performed at a constant current of 0.2 C for 50 minutes. In order to examine if an SEI layer was formed on the anode made of artificial graphite due to the decomposition reaction of the carbonate solvent, differential capacity-voltage (dQ/dV) plots during the initial charge process were obtained and the results are shown in FIG. 3. Peaks shown in the graphs of FIG. 3 means irreversible reactions caused by the decomposition reaction (i.e., lithium consumption reactions during the formation of the SEI layer). The batteries fabricated with the electrolytes solution containing VC (Example 1 and Comparative Example 2) showed no peaks caused by the lithium consumption reactions, suggesting that a passivation layer was produced from VC.

3. Tests of High-Temperature Safety of Cathode and Exothermic Control with Formation of Ligand Each of the batteries fabricated in Example 1 and Comparative Examples 1 and 2 was fully charged to 4.2V. In measurement, a differential scanning calorimeter (DSC), and two high-pressure pans capable of resisting the vapor pressure of the electrolyte solution, were used. In one pan, 5-10 mg of the cathode separated from each of the batteries fabricated in Example 1 and Comparative Examples 1 and 2 and charged to 4.2V was placed, and the other pan was used as an empty pan. The difference in exothermic heat between the two pans was analyzed while heating to 400° C. at a rate of 5° C./min, to determine exothermic temperature peaks. The results are shown in FIG. 4.

Figure 4:
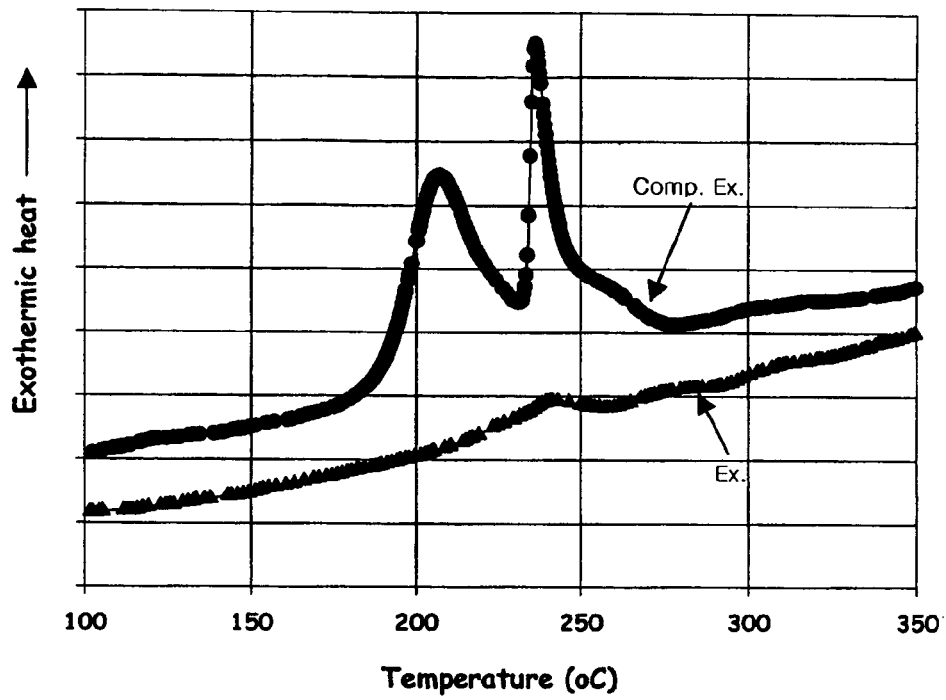
FIG. 4 graphically shows the results of differential scanning calorimetry (DSC) analysis conducted to examine the thermal safeties of a battery containing aliphatic dinitrile (Example) and a battery containing no aliphatic dinitrile (Comparative Example).

As shown in FIG. 4, the battery fabricated without succinonitrile (Comparative Example 1 or 2) showed exothermic peaks around 200° C. and 240° C. The peak at 200° C. indicates there is an exothermic heat caused by a reaction between the electrolyte solution and the cathode, and the peak at 240° C. indicates that there are exothermic heats caused by complicated factors, including a reaction between the electrolyte solution and the cathode, and the breakdown of the cathode. On the other hand, the battery comprising the non-aqueous electrolyte solution containing succinonitrile (Example 1) did not show the above two temperature peaks. This suggests that succinonitrile formed a strong bond with the cathode surface so as to control an exothermic heat caused by a reaction between the electrolyte solution and the cathode and the breakdown of the cathode.

The batteries fabricated in Examples 2 to 6 also showed temperature graphs with no exothermic peaks, as in Example 1.

4. Tests to Examine Improvement of High-Temperature Cycle Life Characteristics

The batteries fabricated in Examples 1 to 6 (batteries where both the cathode and the anode have been passivated) and the batteries fabricated in Comparative Examples 1 to 3 and Example 10 (batteries where either or neither of the cathode and the anode have been passivated) were subjected to charge/discharge cycles at constant current (1 C/1 C) in a 45° C. high-temperature chamber.

Figure 5:
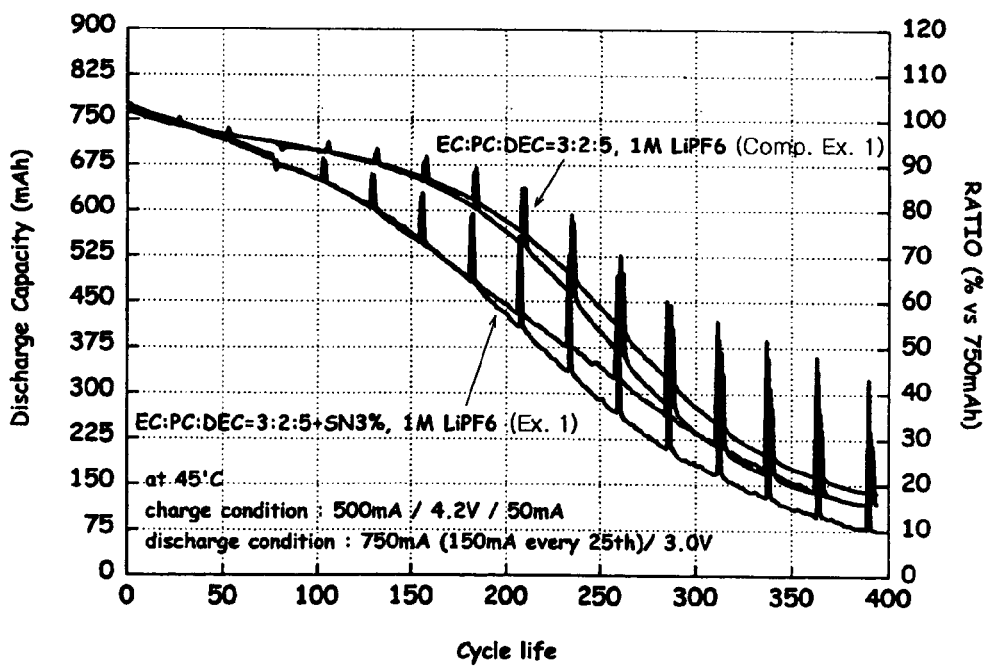
FIG. 5 graphically shows the comparison of 45° C. cycles between a battery comprising an electrolyte solution containing carbonate solvent and 1M $LiPF_6$ salt and a battery comprising an electrolyte solution containing succinonitrile (SN) in addition to carbonate solvent and 1M $LiPF_6$ salt.

(1) FIG. 5 shows the cycle life of the battery fabricated in Comparative Example 1 (containing no additive) and the battery fabricated in Example 10 (containing only SN). As can be seen in FIG. 5, the two batteries all showed a remarkable reduction in high-temperature cycle life characteristics. The reduction in the high-temperature cycle life characteristics of the battery where only the cathode has been protected with SN was caused because the protection layer formed on the cathode surface acted as a resistor within the battery so as to break the balance within the battery.

Figure 6:
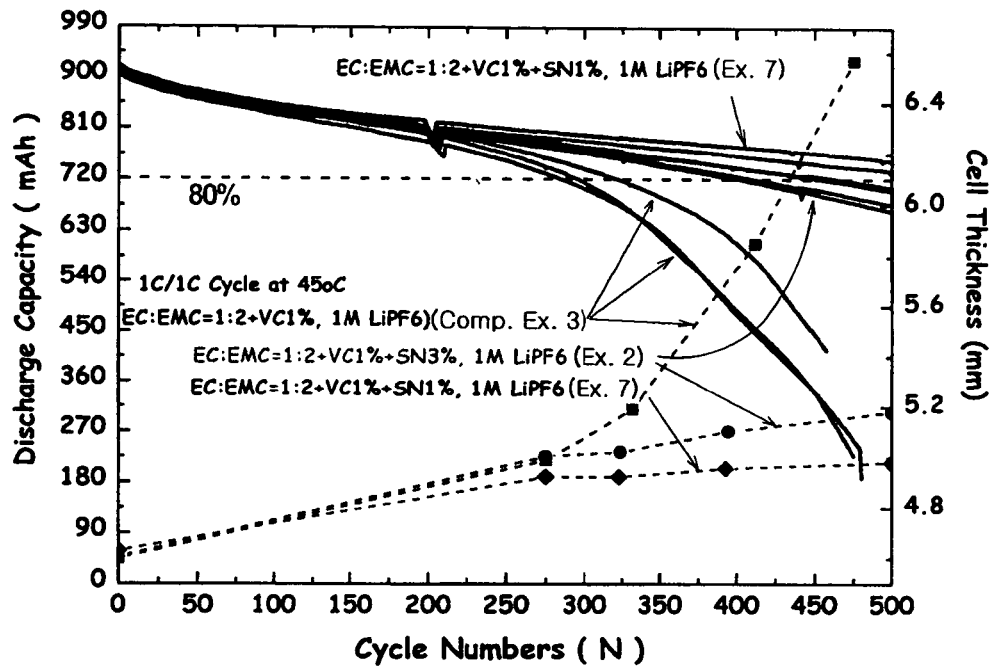
FIG. 6 graphically shows the comparison of 45° C. cycles between a battery passivated with both VC and SN and a battery passivated with only VC without SN.

(2) FIG. 6 shows cycle life for Comparative Example 3 and Examples 2 and 7. As can be seen in FIG. 6, the gas generation (side reaction) from the cathode in the batteries comprising both VC and SN (Examples 2 and 7) was inhibited as compared to the battery comprising only VC (Comparative Example 3), indicating a reduction in the swelling of the battery thickness and an improvement in the high-temperature cycle life.

As shown in FIG. 6, the comparison of Example 2 to Example 7 indicates that, as SN is used at smaller amounts, the effects of battery cycle life and battery thick reduction are more excellent. Since the protection layer formed between SN and the cathode surface acts as a resistor within the battery, SN is preferably used at an amount of less than 5% by weight.

Also, as can be seen in FIGS. 5 and 6, the high-temperature cycle life characteristics of the batteries were significantly different between the battery where both the anode and cathode surfaces have been masked with the protection layer controlling side reactions caused by the carbonate electrolyte solvent and with the protection layer controlling gas generation, respectively, and the battery where only one of the anode and the cathode has been passivated. In the comparison of cycle life characteristics between the battery of Comparative Example 3 and the battery of Example 7, the battery of Comparative Example 3 showed a remarkable reduction in discharge capacity with the progression of charge/discharge cycles, whereas the battery of Example 7 maintained smooth cycle life characteristics.

Figure 7:
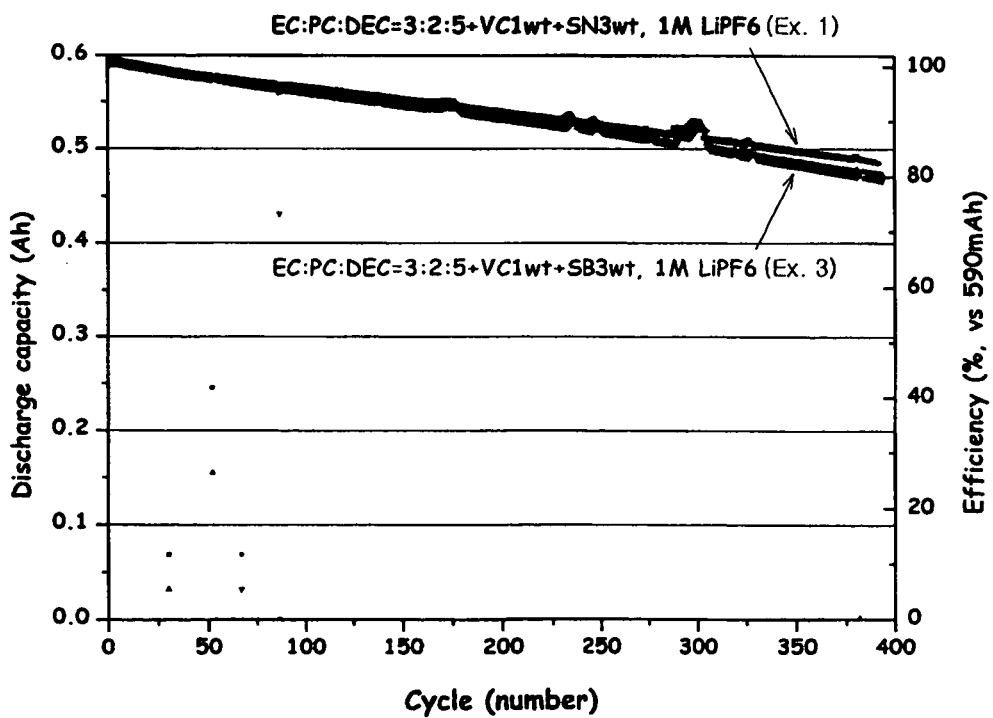
FIG. 7 graphically shows the comparison of 45° C. cycles between a battery containing sebaconitrile, which is an aliphatic nitrile compound, as an electrolyte additive (Example 4) and a battery containing SN as an electrolyte additive.
Figure 8:
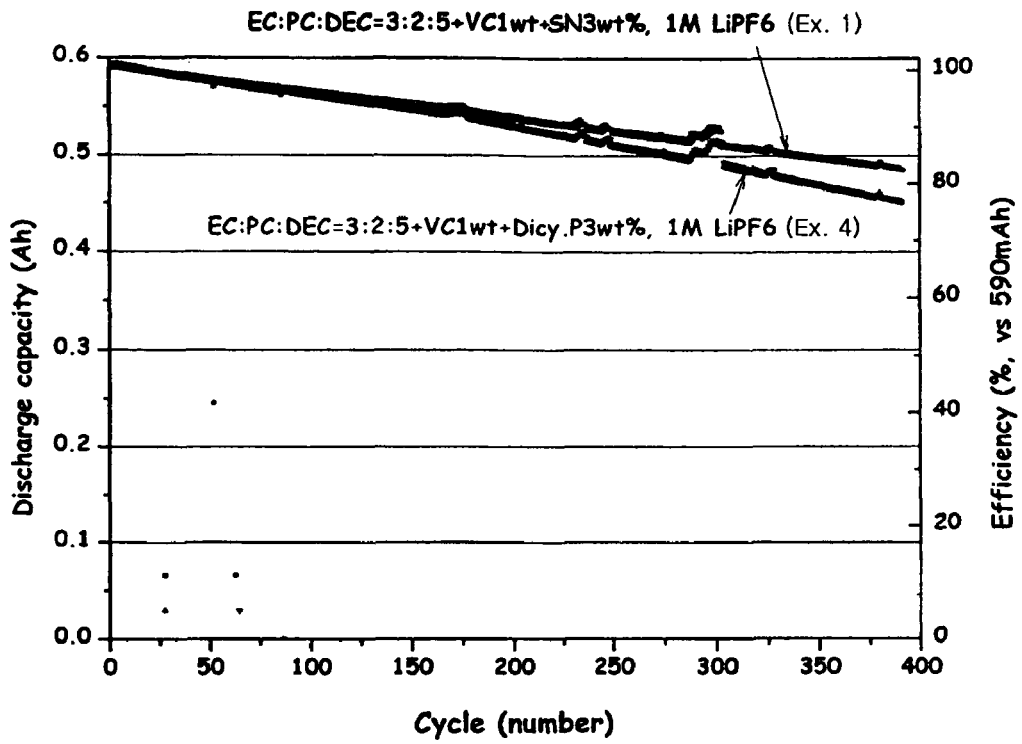
FIG. 8 graphically shows the comparison of 45° C. cycles between a battery containing dicyanopentane, which is an aliphatic nitrile compound, as an electrolyte additive (Example 5) and a battery containing SN as an electrolyte additive.
Figure 9:
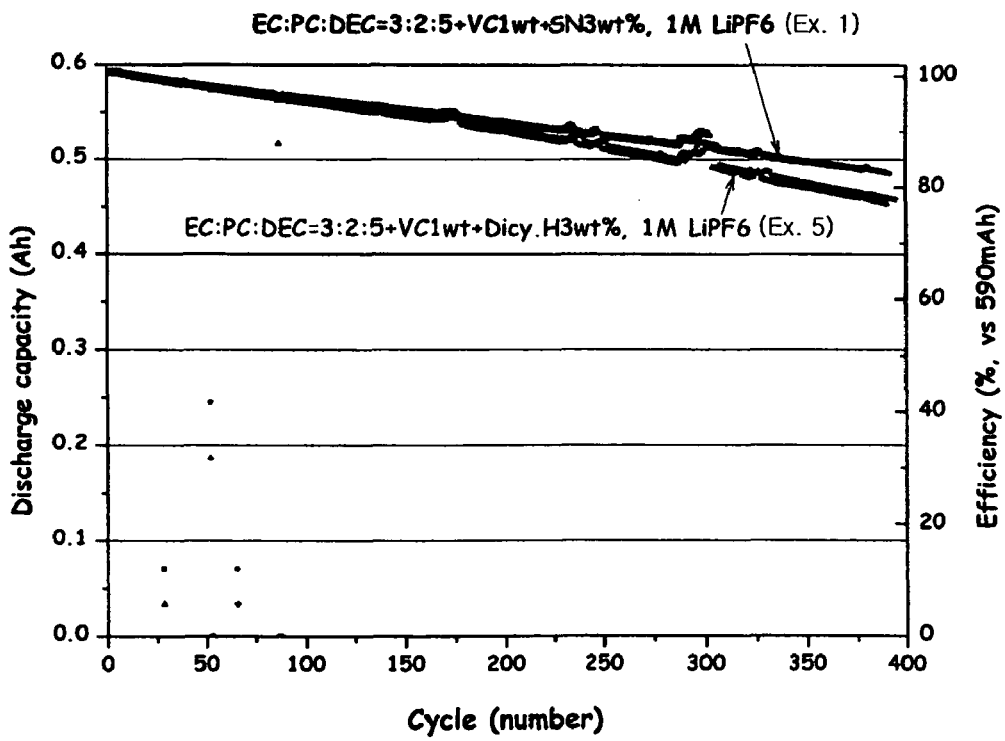
FIG. 9 graphically shows the comparison of 45° C. cycles between a battery containing dicyanohexane, which is an aliphatic nitrile compound, as an electrolyte additive (Example 6) and a battery containing SN as an electrolyte additive.

(3) FIGS. 7 to 9 shows the 45° C. cycle of each of the batteries including sebaconitrile (Example 3), dicyanopentane (Example 4) and dicyanohexane (Example 5) as electrolyte additives, respectively, compared to the battery including SN. The batteries of Examples 3 to 5 showed an excellent 45° C. cycle characteristic, but a reduction in capacity as compared to the battery including SN.

Figure 10:
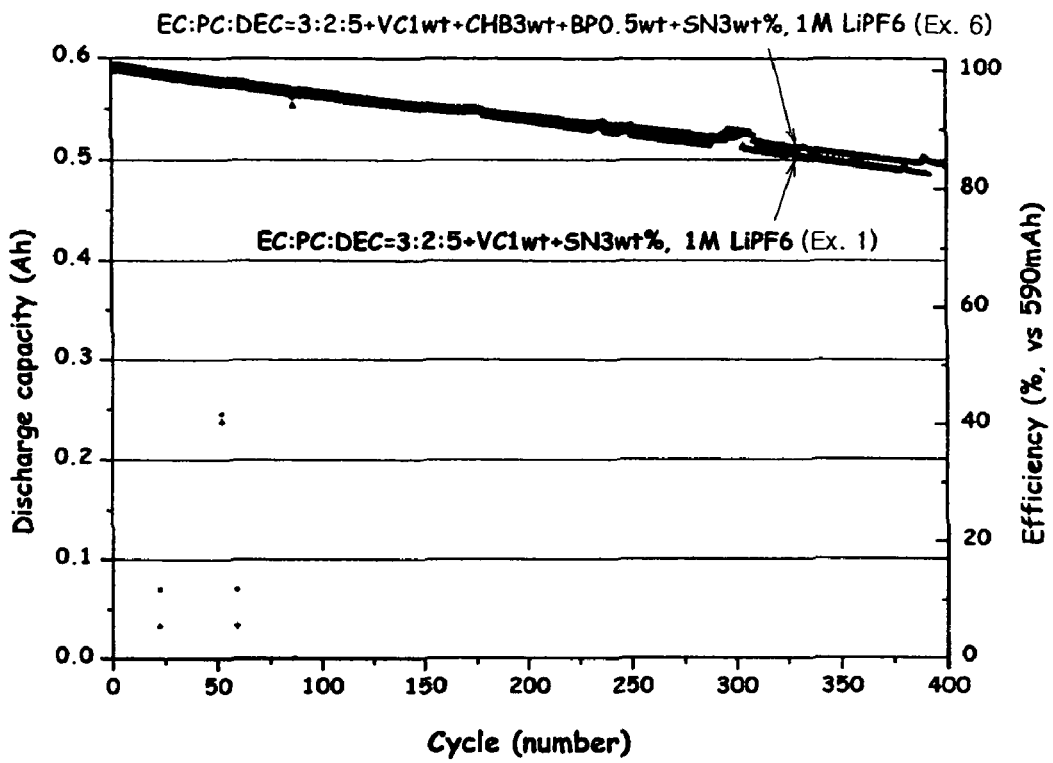
FIG. 10 graphically shows the 45° C. cycle of a battery containing cyclohexylbenzene (CHB) and biphenyl as additive of passivating the cathode upon overcharge, together with SN (Example 6).

(4) FIG. 10 graphically shows the 45° C. cycle of the battery including cyclohexylbenzene (CHB) and biphenyl (BP), additives of passivating the cathode upon overcharge, in addition to SN (Example 6). From FIG. 10, it can be found that additives of forming a passivation layer on the cathode surface upon overcharge, such as cyclehexylbenzene (CHB), biphenyl (BP) and anisole, can maintain the performance of lithium secondary batteries even when they are used in an electrolyte solution in combination with the aliphatic nitrile compound.

5. Battery Performance Test

Figure 11:
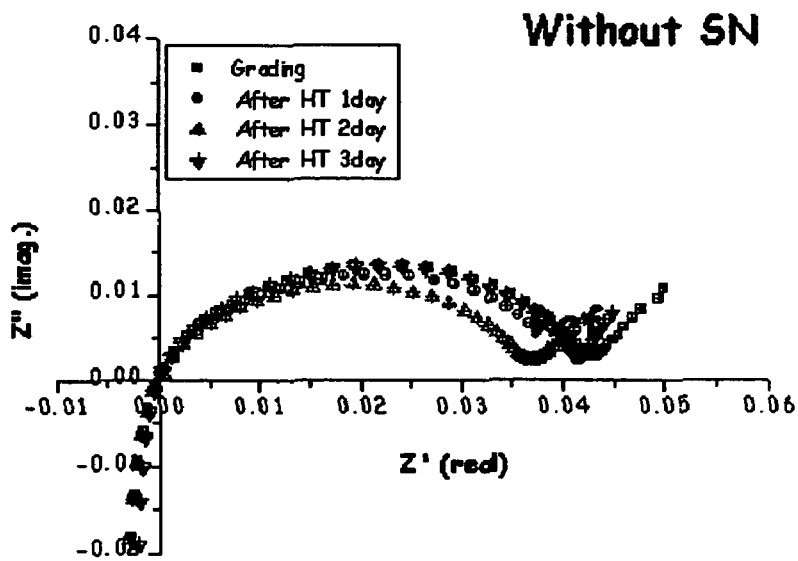
FIG. 11 graphically shows the results of EIS for a battery of Comparative Example 2 conducted in a charged state after storing the battery in a discharged state at 60° C. for each of 1 day, 2 day and 3 day.
Figure 12:
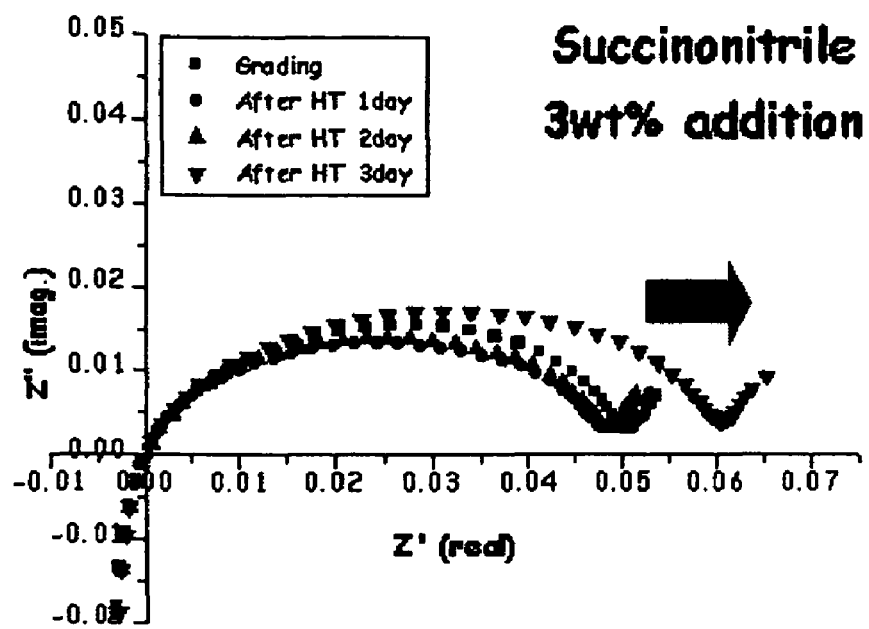
FIG. 12 graphically shows the results of EIS for a battery of Example 1 conducted in a charged state after storing the battery in a discharged state at 60° C. for each of 1 day, 2 day and 3 day.

The batteries fabricated in Example 1 and Comparative Example 2 were stored in a discharged state at 60° C. for each of 1 day, 2 days and 3 days, and then subjected to electrochemical impedance spectroscopy (EIS), and the results are shown in FIG. 12 (Example 1) and FIG. 11 (Comparative Example 2). As can be seen in FIGS. 11 and 12, SN formed a strong complex with the cathode surface by the high-temperature storage, and the storage for 3 days at 60° C. showed the largest increase in resistance circle, indicating the highest effect.

Figure 13:
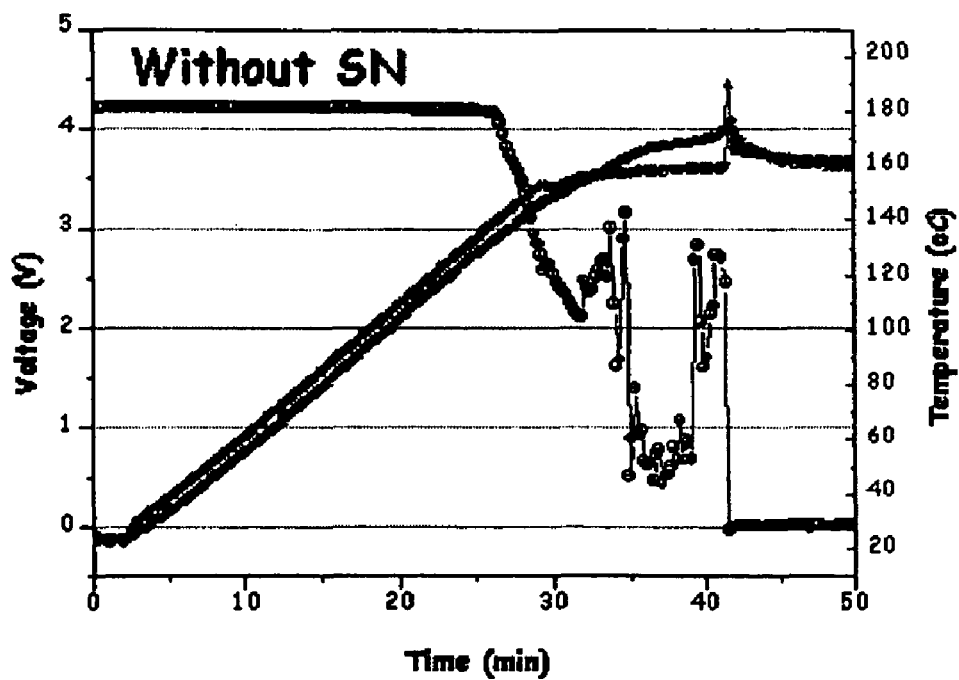
FIG. 13 graphically shows the results of hot box test for a battery of Comparative Example 2 conducted in a fully charged state after storing the battery in a discharged state at 60° C. for 3 days.
Figure 14:
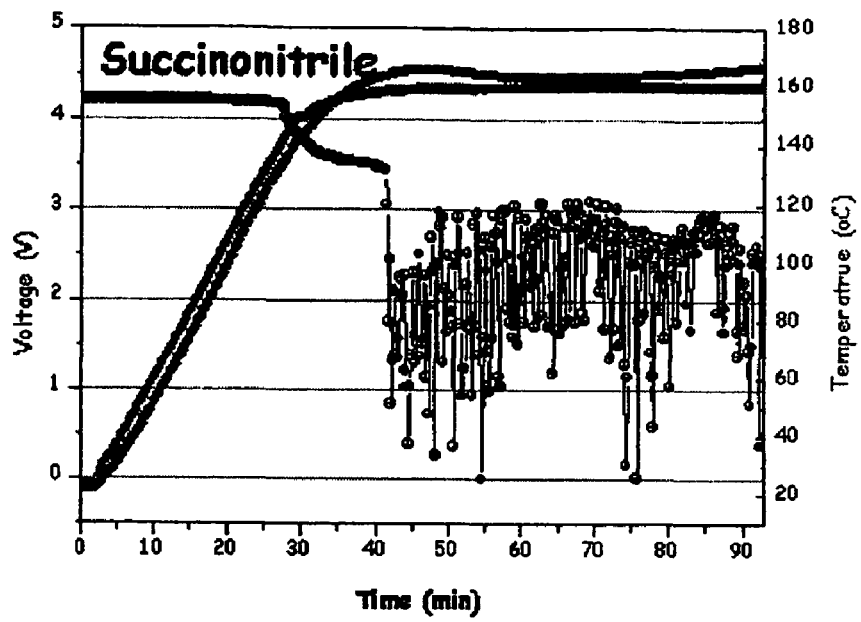
FIG. 14 graphically shows the results of hot box test for a battery of Example 1 conducted in a fully charged state after storing the battery in a discharged state at 60° C. for 3 days.

6. Hot Box Test (1) The batteries fabricated in Example 1 and Comparative Example 2 were stored in a discharged state at 60° C. for 3 days, and then fully charged. In hot box test, the fully charged batteries were placed in a convention oven and heated from ambient temperature to 160° C. at a rate of 5° C./min. Then, the batteries were exposed to 160° C. for 1 hour so as to examine whether the batteries caught fire or not. The results are shown in FIG. 13 (Comparative Example 2) and FIG. 14 (Example 1).

The battery of Comparative Example 2 caught fire immediately after reaching 160° C. (see FIG. 13), whereas the battery of Example 2 did not catch fire in the same condition (see FIG. 14).

(2) The batteries fabricated in Examples 1, 2, 8 and 9 and Comparative Examples 1 were fully charged. In hot box test, the fully charged batteries were placed in a convention oven and heated from ambient temperature to 150° C. or 160° C. at a rate of 5° C./min. Then, the batteries were exposed to 150° C. or 160° C. for 1 hour so as to examine whether the batteries caught fire or not.

Figure 15:
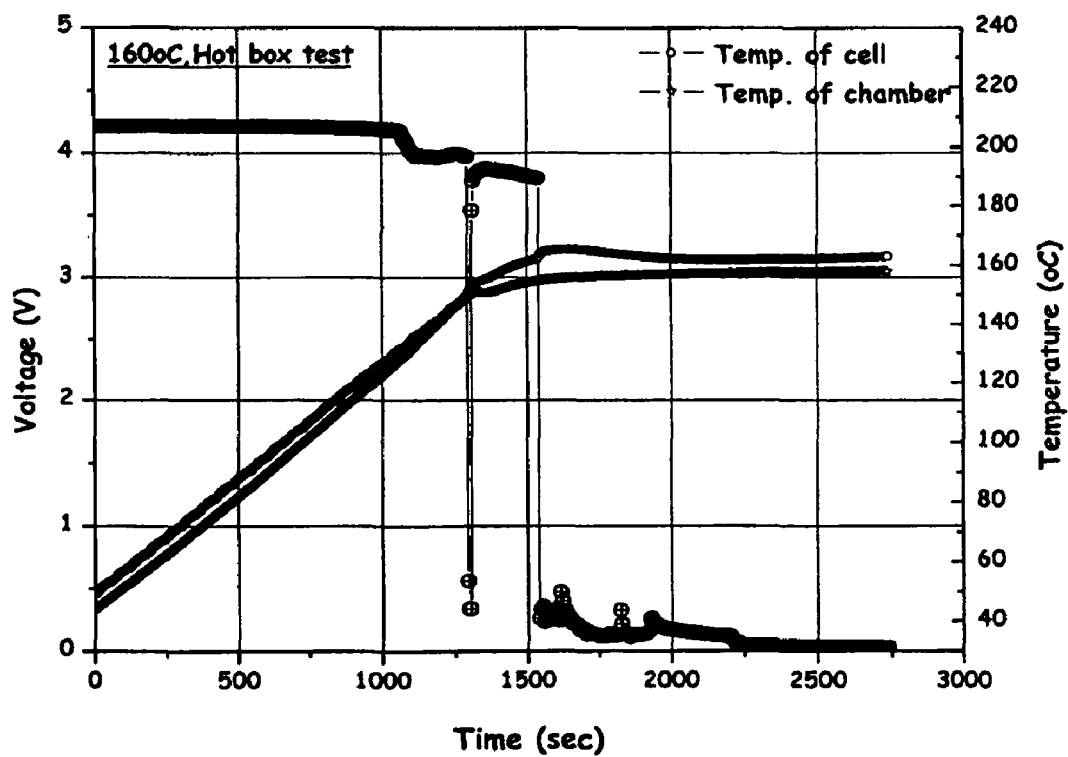
FIG. 15 graphically shows the results of hot box test at 160° C. for a battery of Example 1 or 8.
Figure 16:
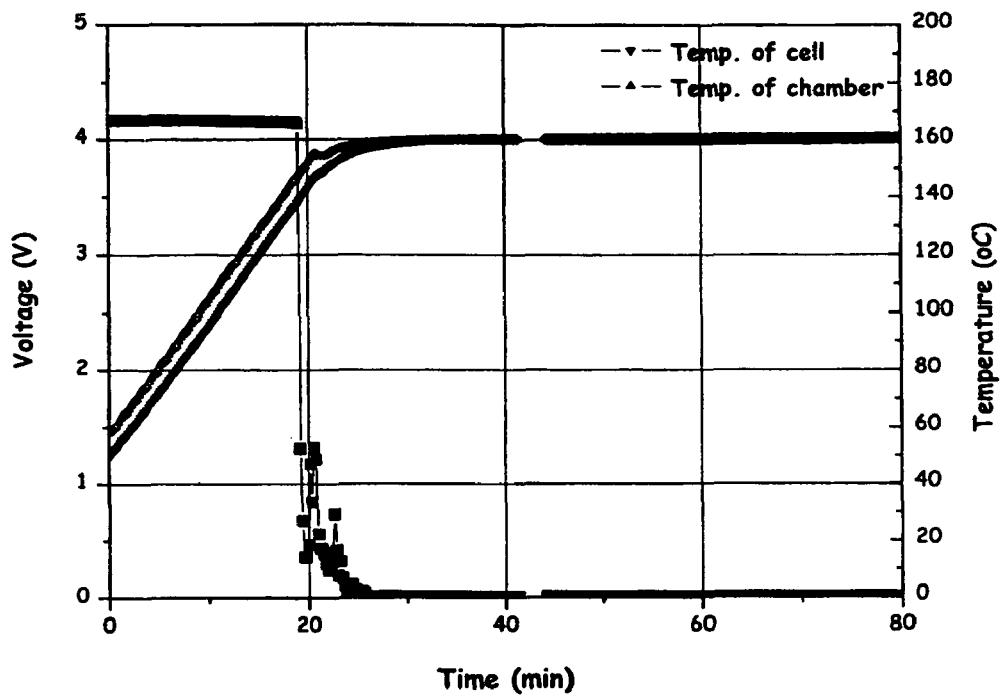
FIG. 16 graphically shows the results of hot box test at 160° C. for a battery of Example 2 or 9.
Figure 17:
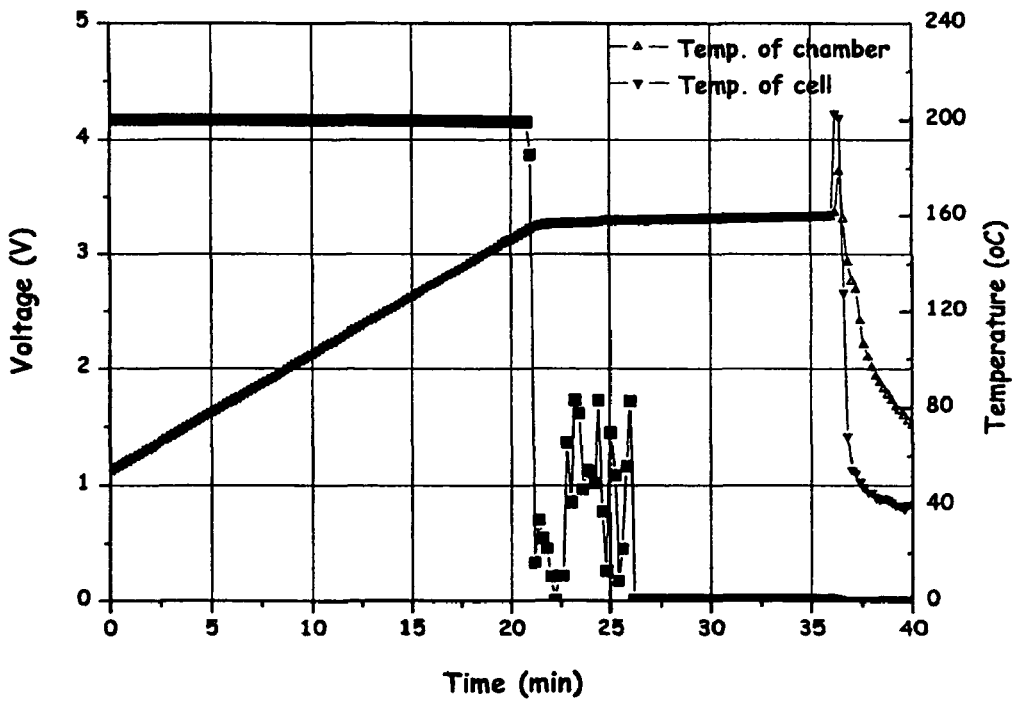
FIG. 17 graphically shows the results of hot box test at 160° C. for a battery of Comparative Example 1.

The battery of Comparative Example 1 caught fire immediately after reaching 160° C. (see FIG. 17), whereas the batteries of Examples 1 and 8 (FIG. 15) and Examples 2 and 9 (FIG. 16) did not catch fire in the same condition (see FIG. 14).

The results of the hot box tests are summarized in Table 2 below.

TABLE 2

| Examples | Exposure temperature | Fire |
| --- | --- | --- |
| Comparative Example 1 | 150° C. | Caught fire |
|  | 160° C. | Caught fire |
| Examples 1 and 8 | 150° C. | Not caught fire |
|  | 160° C. | Not caught fire |
| Example 2 and 9 | 150° C. | Not caught fire |
|  | 160° C. | Not caught fire |

Figure 18:
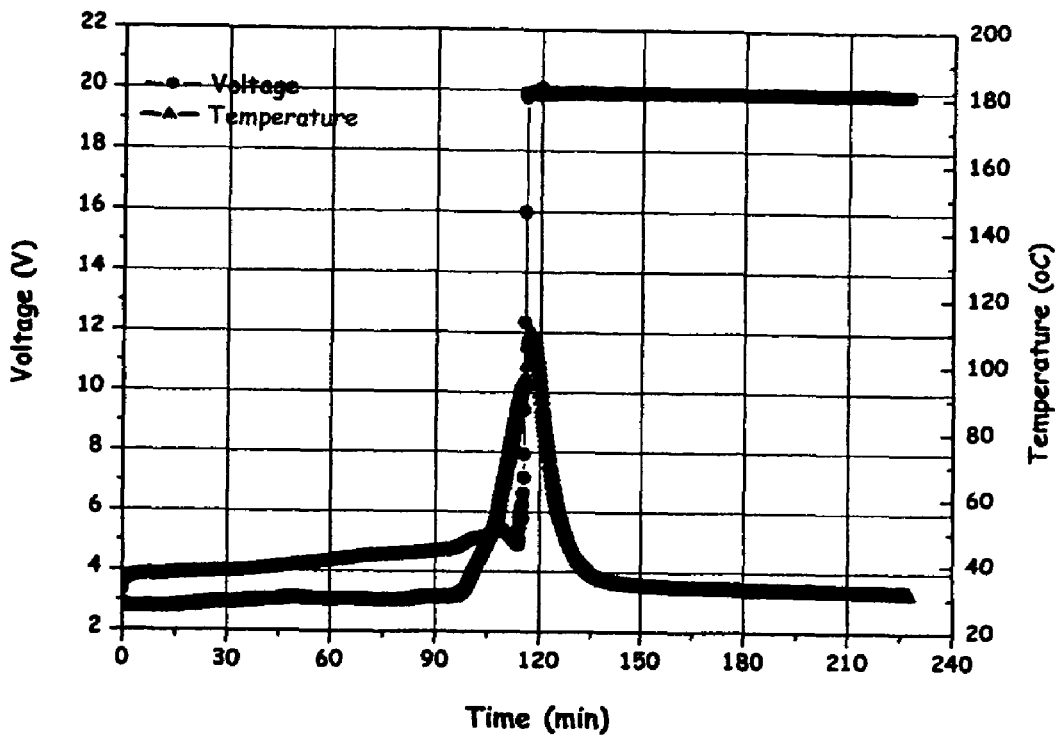
FIG. 18 graphically shows the results of overcharge test at 20V and 1 C for batteries fabricated in Examples 8 and 9.
Figure 19:
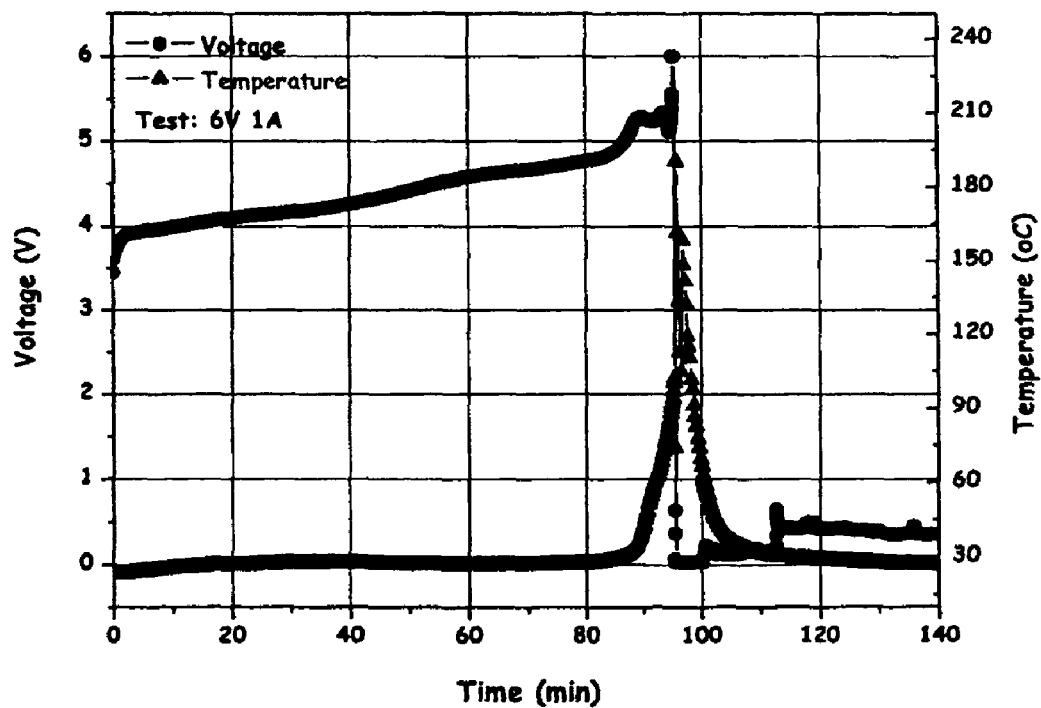
FIG. 19 graphically shows the results of overcharge test at 6V and 1 A for batteries fabricated in Comparative Examples 2 and 3.

7. Overcharge Test (1) For the batteries fabricated in Examples 8 and 9 and Comparative Examples 2 and 3, overcharge tests were performed under conditions of 6V and 1 A, 6V and 2 A, 12V and 1 C, and 20V and 1 C in constant current and constant voltage modes, and as a result, changes in temperature were shown in FIG. 18 (conditions of 20V and 1 C) and FIG. 19 (conditions of 6V and 1 A). As can be seen in FIGS. 18 and 19, the batteries of Examples 8 and 9 (FIG. 18) showed an improvement in safety upon overcharge as compared to the batteries of Comparative Examples 2 and 3 (FIG. 19). Namely, in FIG. 19 (Comparative Examples 2 and 3), a peak temperature of more than 200° C. was measured due to an exothermic reaction caused by electrolyte oxidation within the batteries and the structural breakdown of the cathodes, while the batteries caught fire and were short-circuited. On the other hand, the secondary batteries having the electrolytes solution containing the succinonitrile additive (Examples 8 and 9) showed a peak temperature around 100° C. by the control of exothermic reactions in the batteries.

(2) The overcharge test was repeated several times and, the mean values of the results are summarized in Table 3 below.

TABLE 3

|  | 6 V and 1 A | 6 V and 2 A | 12 V and 1 C | 20 V and 1 C |
| --- | --- | --- | --- | --- |
| Example 8 | Pass | Pass | Pass | Pass |
| Example 9 | Pass | Pass | Pass | Pass |
| Comparative Example 2 | Fail | Fail | Fail | Fail |
| Comparative Example 3 | Fail | Fail | Fail | Fail |

Industrial Applicability

As described above, the present invention provides the electrochemical device comprising the cathode having the protection layer formed by the complex between the surface of the cathode active material and the aliphatic nitrile compound. This electrochemical device can control heat caused by a reaction between the electrolyte solution and the cathode upon heating and heat caused by the structural breakdown of the cathode, and reduce exothermic heat generated therefrom, thus preventing the battery from catching fire due to the generation of internal short circuits caused by excessive exothermic heat upon overcharge.

Also, the inventive electrochemical device comprises the anode having the passivation layer formed on the surface by VC, its derivatives or ether compounds, and the cathode having the protection layer formed by complexation between the surface of the cathode active material and the aliphatic nitrile compound. This electrochemical device can prevent the battery performance from being reduced (e.g., capacity reduction and thickness change caused by gas generation) due to a reaction between the electrolyte solution and the cathode upon high temperature cycling (45° C.) and side reactions caused by the structural breakdown of the passivation layer of the anode. Also, this electrochemical device can prevent the battery from catching fire and bursting due to exothermic heat generation caused by said reactions, and at the same time, causes a synergistic effect to maintain high capacity and high efficiency, thus improving battery cycle life characteristics. In addition, this electrochemical device can have excellent high-temperature safety.

The invention claimed is:

1. An electrochemical device comprising:
a cathode having a protection layer formed by a complex between the surface of a cathode active material and an aliphatic nitrile compound;
an anode; and
an electrolyte solution containing a lithium salt and a solvent,
wherein the complex between the surface of the cathode active material and the aliphatic nitrile compound is formed by immersing the cathode having the cathode active material applied on a collector in an electrolyte solution containing the aliphatic nitrile compound and then treating the resultant cathode at a temperature of 60-90° C.,
wherein the cathode active material is at least one selected from the group consisting of $LiCoO_2$, $LiNiO_2$, $LiMn_2O_4$, $LiMnO_2$ and $LiNi_{1-x}Co_xO_2$ ($0<x<1$);
wherein the aliphatic nitrile compound is represented by the following formula 1:

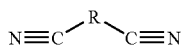

(Formula 1)

wherein R represents an alkylene group having 1 to 15 carbon atoms; and
wherein the anode has a passivation layer formed by a compound selected from the group consisting of vinylene carbonate represented by the following formula 2, its derivative and an ether compound:

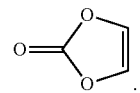

(Formula 2)

2. The electrochemical device of claim 1, wherein the ether compound is benzyl methyl ether or tetraethylene glycol dimethyl ether.

3. The electrochemical device of claim 1, wherein the solvent is at least one cyclic carbonate selected from the group consisting of ethylene carbonate (EC), propylene carbonate (PC) and gamma-butyrolactone (GBL); at least one linear carbonate selected from the group consisting of diethyl carbonate (DEC), dimethyl carbonate (DMC), ethylmethyl carbonate (EMC) and methylpropyl carbonate (MPC); or a combination of the cyclic carbonate and the linear carbonate.

4. The electrochemical device of claim 1, wherein the aliphatic nitrile compound is succinonitrile.

5. A cathode having a protection layer formed by a complex between the surface of a cathode active material and an aliphatic nitrile compound,
wherein the complex between the surface of the cathode active material and the aliphatic nitrile compound is formed by immersing the cathode having the cathode active material applied on a collector in an electrolyte solution containing the aliphatic nitrile compound and then treating the immersed cathode at a temperature of 60-90° C.;
wherein the cathode active material is at least one selected from the group consisting of $LiCoO_2$, $LiNiO_2$, $LiMn_2O_4$, $LiMnO_2$ and $LiNi_{1-x}Co_xO_2$($0<x<1$); and
wherein the aliphatic nitrile compound is represented by the following formula 1:

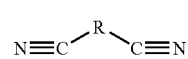

(Formula 1)

wherein R represents an alkylene group having 1 to 15 carbon atoms.

6. The cathode of claim 5, wherein the aliphatic nitrile compound is succinonitrile.

7. The electrochemical device of claim 1, wherein the cathode having the complex formed between the surface of the cathode active material and the aliphatic nitrile compound is prepared prior to assembly of the electrochemical device and used in assembly of the electrochemical device.

* * * * *